(12) United States Patent
Chen et al.

(10) Patent No.: US 9,313,782 B2
(45) Date of Patent: Apr. 12, 2016

(54) ENHANCED PDSCH OPERATION

(71) Applicant: QUALCOMM Incorporated, San Diego, CA (US)

(72) Inventors: Wanshi Chen, San Diego, CA (US); Aleksandar Damnjanovic, Del Mar, CA (US); Peter Gaal, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 14/221,588

(22) Filed: Mar. 21, 2014

(65) Prior Publication Data

US 2014/0334397 A1 Nov. 13, 2014

Related U.S. Application Data

(60) Provisional application No. 61/821,138, filed on May 8, 2013.

(51) Int. Cl.
*H04J 3/04* (2006.01)
*H04W 4/00* (2009.01)
*H04W 72/04* (2009.01)
*H04L 5/00* (2006.01)

(52) U.S. Cl.
CPC ........... *H04W 72/042* (2013.01); *H04L 5/0037* (2013.01); *H04L 5/0044* (2013.01); *H04L 5/0053* (2013.01); *H04L 5/0064* (2013.01); *H04L 5/0007* (2013.01)

(58) Field of Classification Search
CPC . H04W 72/042; H04L 5/0053; H04L 5/0091; H04L 5/0023; H04L 5/00
USPC ............ 370/203–210, 329–331, 468, 395.21, 370/337, 344, 319, 321
See application file for complete search history.

(56) References Cited

U.S. PATENT DOCUMENTS

| | | | | |
|---|---|---|---|---|
| 8,811,285 | B2 * | 8/2014 | Qu et al. | 370/328 |
| 8,995,377 | B2 * | 3/2015 | Wang et al. | 370/329 |
| 2014/0269368 | A1 * | 9/2014 | Xu et al. | 370/252 |

OTHER PUBLICATIONS

Ericsson ., et al., "Details of multiplexing of DCI messages", 3GPP Draft, R1-121023, 3rd Generat Ion Partnership Project (3GPP), Mobile Competence Centre, 650, Route Des Lucioles, F-06921 Sophia Antipolis Cedex , France, vol. RAN WG1, No. Jeju, Republic of Korea, 20129326-20120330, Mar. 20, 2012 , XP050599331, pp. 1-3.

(Continued)

*Primary Examiner* — Hanh N Nguyen
(74) *Attorney, Agent, or Firm* — Norton Rose Fulbright US LLP

(57) ABSTRACT

An enhanced data transmission operation is disclosed in which PDSCH and/or EPDCCH may be transmitted in the first symbol either with or without legacy control information multiplexed with the data transmissions. Base stations operating according to the various aspects may transmit indicators to related mobile devices that identify when such PDSCH/EPDCCH are transmitted in the first symbol period. UEs receive the multiplexed data transmissions and decode the appropriate PDSCH/EPDCCH transmissions along with any multiplexed legacy control information.

30 Claims, 8 Drawing Sheets

(56) References Cited

OTHER PUBLICATIONS

Huawei., et al., "Analysis on control signaling enhancements", 3GPP Draft, R1-130892, 3rd Generation Partnership Project (3GPP), Mobile Competence Centre, 650, Route Des Lucioles, F-06921 Sophia-Antipolis Ceoex, France vol. RAN WG1, No. Chicago, USA, Apr. 15, 2013-Apr. 19, 2013 Apr. 6, 2013, XP050696894, Retrieved from the Internet: URL:http://www.3gpp.org/ftp/tsg ran/WG1RL1/TSGR172b/Docs/ [retrieved on Apr. 6, 2013], pp. 1-3.

Huawei., et al., Remaining details for the POSCH starting symbol in TM10°, 3GPP Draft, R1-124696, 3rd Generation Partnership Project (3GPP), Mobile Competence Centre, 650, Route Des Lucioles, F-06921 Sophia-Antipolis Cedex, France, vol. RAN WG1, No. New Orleans, USA, Nov. 12, 2012-Nov. 16, 2012 Nov. 3, 2012, XP050662740, Retrieved from the Internet: URL:http://www.3gpp.org/ftp/tsg ran/WG1 RL 1/TSGR1 71/Docs/[retrieved on Nov. 3, 2012], pp. 1-3.

International Search Report and Written Opinion—PCT/US2014/035458—ISA/EPO—Jul. 30, 2014.

Qualcomm Incorporated: "Control Channel Overhead Reduction", 3GPP Draft, R1-132491 Control Channel Overhead Reduction, 3rd Generation Partnership Project (3GPP), Mobile Competence Centre, 650, Route Des Lucioles, F-06921 Sophia-Antipolis Cedex, France vol. RAN WG1, No. Fukuoka, Japan, May 20, 2013-May 24, 2013 May 11, 2013, XP050698209, pp. 3. Retrieved from the Internet: URL:http://www.3gpp.org/ftp/tsg ran/WG1RL1/TSGR1 73/Docs/ [retrieved on May 11, 2013] the whole document.

\* cited by examiner

ENHANCED PDSCH OPERATION

CROSS-REFERENCE TO RELATED APPLICATIONS

This application claims the benefit of U.S. Provisional Patent Application No. 61/821,138, entitled, "ENHANCED PDSCH OPERATION", filed on May 8, 2013, which is expressly incorporated by reference herein in its entirety.

BACKGROUND

1. Field

Aspects of the present disclosure relate generally to wireless communication systems, and more particularly, to enhanced physical downlink shared channel operations.

2. Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

Various aspects of the present disclosure are directed to an enhanced data transmission operation in which PDSCH and/or EPDCCH may be transmitted in the first symbol either with or without legacy control information multiplexed with the data transmissions. Base stations operating according to the various aspects may transmit indicators to related mobile devices that identify when such PDSCH/EPDCCH are transmitted in the first symbol period. UEs receive the multiplexed data transmissions and decode the appropriate PDSCH/EPDCCH transmissions along with any multiplexed legacy control information.

One aspect of the disclosure relates to a method of wireless communication that includes generating a transmission, multiplexing data in a first symbol duration of the transmission, and sending the transmission from a base station to a mobile device. The transmission includes a subframe, where a first portion of the subframe is allocated for legacy control information. This first portion includes at least the first symbol duration. The multiplexed data does not include legacy control information.

An additional aspect of the disclosure relates to a method of wireless communication that includes receiving at transmission from a base station at a mobile device and decoding the transmission. The transmission includes data in at least a first symbol of a subframe from a base station. This data transmission is multiplexed with legacy control transmissions in at least the first symbol.

An additional aspect of the disclosure relates to an apparatus configured for wireless communication that includes means for generating a transmission. The transmission includes a subframe and a first portion of the subframe being allocated for legacy control information. The first portion of the subframe includes at least a first symbol duration. The apparatus also includes means for multiplexing data in the first symbol duration. This data does not include legacy control information. The apparatus further includes means for sending the transmission from a base station to a mobile device.

An additional aspect of the disclosure relates to an apparatus configured for wireless communication that includes means for receiving at transmission from a base station at a mobile device and means for decoding the transmission. The transmission includes data in at least a first symbol of a subframe from a base station. This data transmission is multiplexed with legacy control transmissions in at least the first symbol.

An additional aspect of the disclosure relates to a computer program product for wireless communications in a wireless network including a non-transitory computer-readable medium having program code recorded thereon. The program code includes code for causing a computer to generate a transmission. This transmission includes a subframe and a first portion of the subframe being allocated for legacy control information. The first portion includes at least a first symbol duration, for causing the computer to multiplex data in the first symbol duration. This data does not include legacy control information. The program code also includes code for causing the computer to send the transmission from a base station to a mobile device.

An additional aspect of the disclosure relates to a computer program product for wireless communications in a wireless network including a non-transitory computer-readable medium having program code recorded thereon. The program code includes code for causing a computer to receive at transmission from a base station at a mobile device and for causing the computer to decode the transmission. The transmission includes data in at least a first symbol of a subframe from a base station. This data transmission is multiplexed with legacy control transmissions in at least the first symbol.

An additional aspect of the disclosure relates to an apparatus configured for wireless communication that includes at least one processor and a memory coupled to the processor. The processor is configured to generate a transmission. The transmission includes a subframe and a first portion of the subframe being allocated for legacy control information, in which the first portion includes at least a first symbol duration. The processor is further configured to multiplex data in the first symbol duration. This data does not include legacy control information. The processor is further configured to send the transmission from a base station to a mobile device.

An additional aspect of the disclosure relates to an apparatus configured for wireless communication that includes at least one processor and a memory coupled to the processor. The processor is configured to receive at transmission from a base station at a mobile device and to decode the transmission. The transmission includes data in at least a first symbol of a subframe from a base station. This data transmission is multiplexed with legacy control transmissions in at least the first symbol.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LIE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
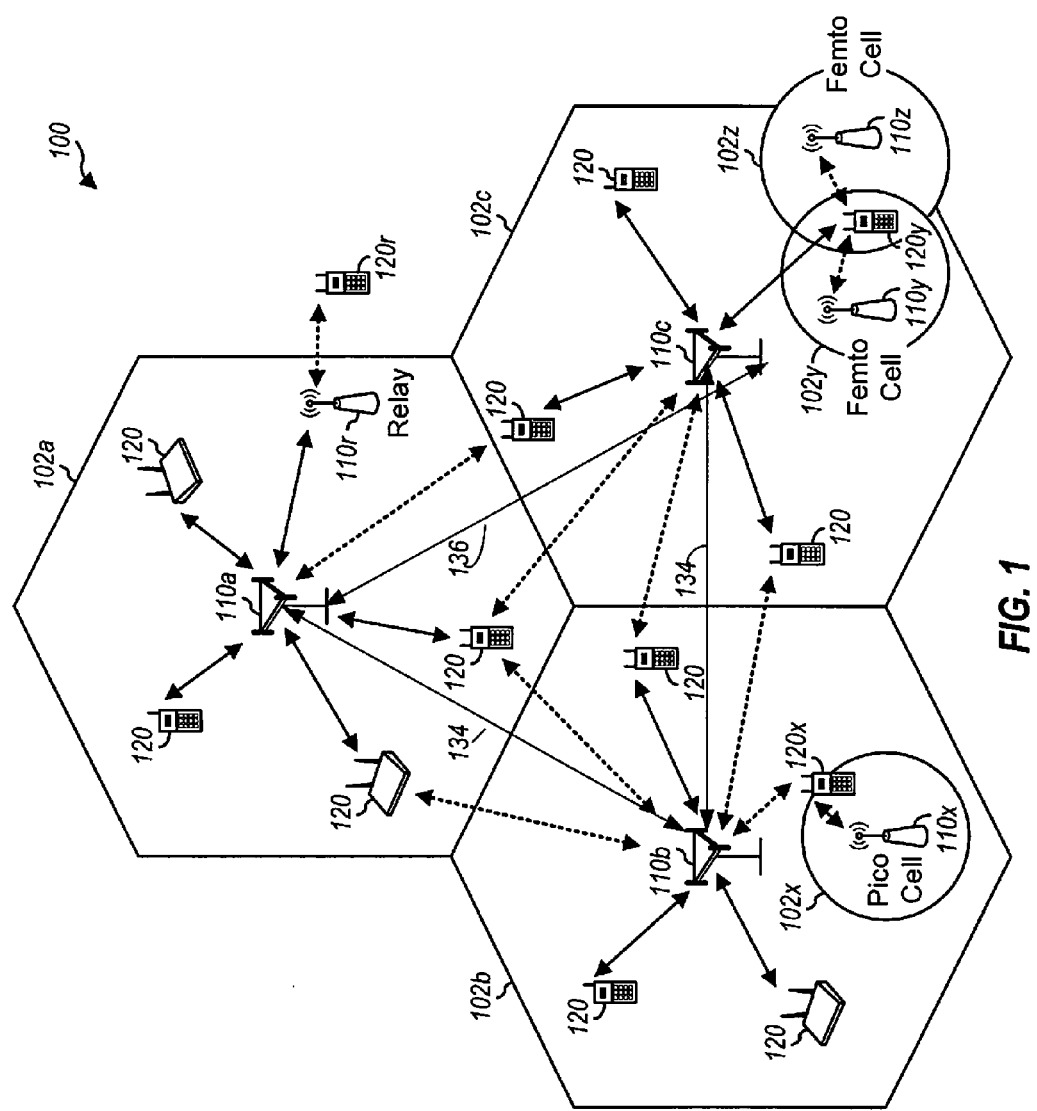
FIG. 1 is a block diagram conceptually illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells. The eNBs may communicate directly through backhaul communication links, such as backhauls 134 and 136, respectively.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
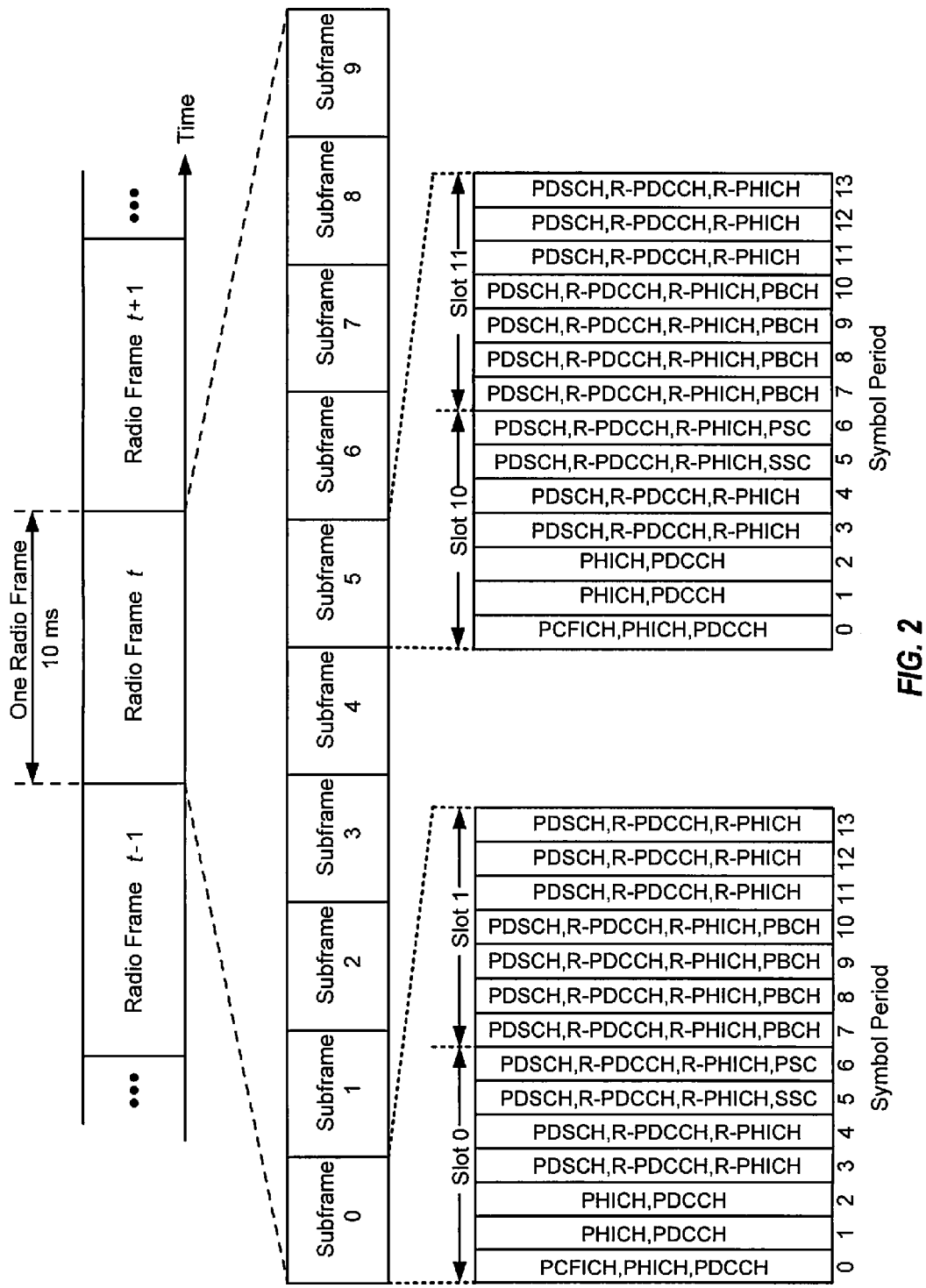
FIG. 2 is a block diagram conceptually illustrating an example of a downlink frame structure in a mobile communication system.

FIG. 2 shows a downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE/-A, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks per slot. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In addition to sending PHICH and PDCCH in the control section of each subframe, i.e., the first symbol period of each subframe, the LTE-A may also transmit these control-oriented channels in the data portions of each subframe as well. As shown in FIG. 2, these new control designs utilizing the data region, e.g., the Relay-Physical Downlink Control Channel (R-PDCCH) and Relay-Physical HARQ Indicator Channel (R-PHICH) are included in the later symbol periods of each subframe. The R-PDCCH is a new type of control channel utilizing the data region originally developed in the context of half-duplex relay operation. Different from legacy PDCCH and PHICH, which occupy the first several control symbols in one subframe, R-PDCCH and R-PHICH are mapped to resource elements (REs) originally designated as the data region. The new control channel may be in the form of Frequency Division Multiplexing (FDM), Time Division Multiplexing (TDM), or a combination of FDM and TDM.

Depending on how an eNB may be configured or the configuration of any feature being operated by eNB, the eNB may transmit various signals and channels to UEs through broadcast, unicast, sending to specific groups of UEs, and the like. For example, the eNB may send the PSS, SSS and PBCH in the center 1.08 MHz of the system bandwidth used by the eNB. The eNB may also send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs and may also send the PDSCH in a unicast manner to specific UEs. In an alternative to the eNB sending PDCCH to groups of UEs, an eNB may also send the PDCCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
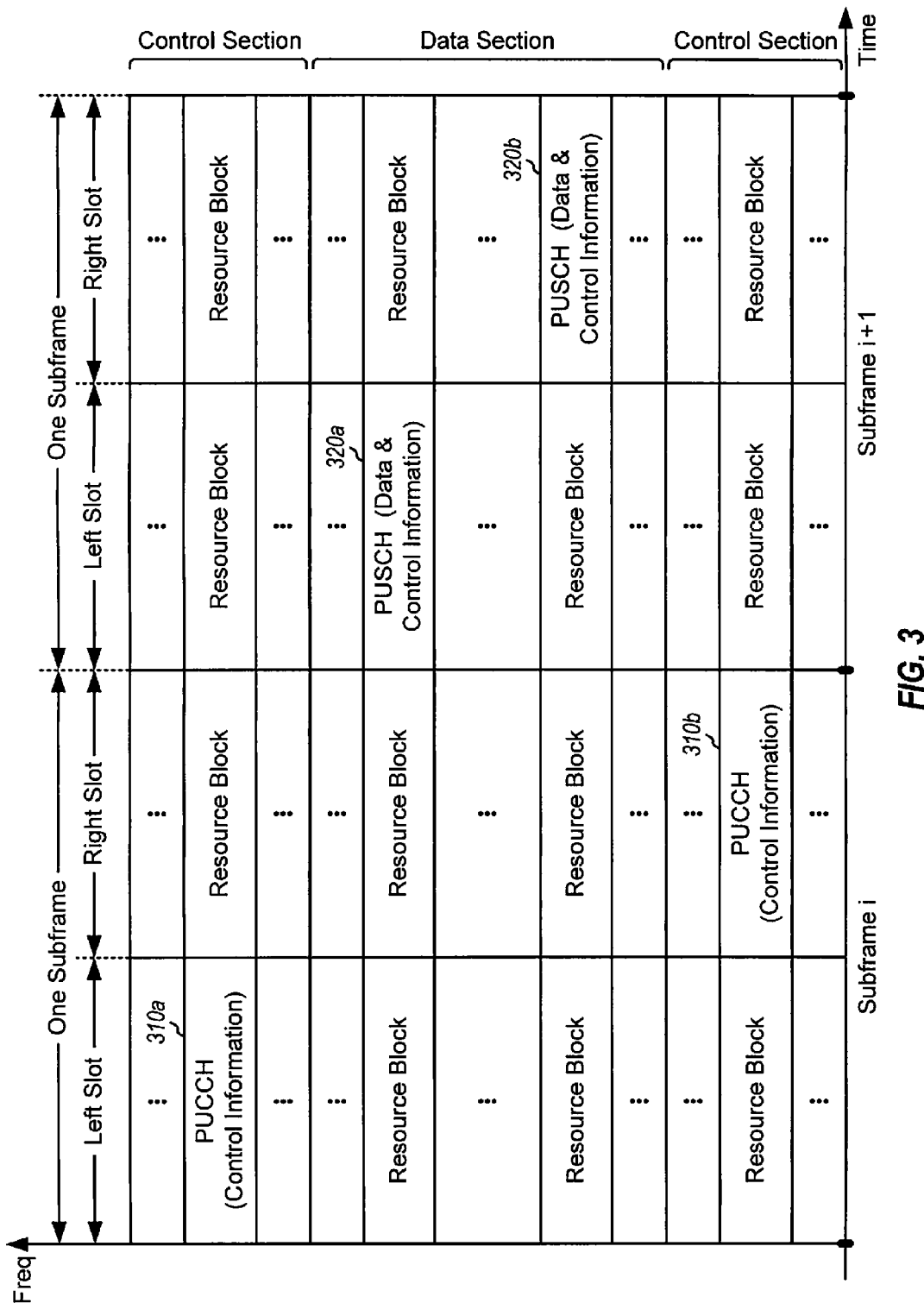
FIG. 3 is a block diagram conceptually illustrating an exemplary frame structure in uplink LTE/-A communications.

FIG. 3 is a block diagram illustrating an exemplary frame structure 300 in uplink long term evolution (LTE/-A) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNode B. The UE may transmit control information in a Physical Uplink Control Channel (PUCCH) on the assigned resource blocks 310a and 310b in the control section. The UE may transmit only data or both data and control information in a Physical Uplink Shared Channel (PUSCH) on the assigned resource blocks 320a and 320b in the data section. An uplink transmission may span both slots of a subframe and may hop across frequency as shown in FIG. 3.

Referring back to FIG. 1, the wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110a-c are usually carefully planned and placed by the provider of the wireless network 100. The macro eNBs 110a-c generally transmit at high power levels (e.g., 5 W-40 W). The pico eNB 110x and the relay station 110r, which generally transmit at substantially lower power levels (e.g., 100 mW-2 W), may be deployed in a relatively unplanned manner to eliminate coverage holes in the coverage area provided by the macro eNBs 110a-c and improve capacity in the hot spots. The femto eNBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110y-z typically also transmit at substantially lower power levels (e.g., 100 mW-2 W) than the macro eNBs 110a-c.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110x, is characterized by a substantially lower transmit power when compared with a macro eNB, such as the macro eNBs 110a-c. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110a-c and the pico eNB 110x implies that, in a mixed deployment, the downlink coverage area of the pico eNB 110x will be much smaller than that of the macro eNBs 110a-c.

In the uplink case, however, the signal strength of the uplink signal is governed by the UE, and, thus, will be similar when received by any type of the eNBs 110. With the uplink coverage areas for the eNBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in the wireless network 100 than in a macro eNB-only homogeneous network, where the downlink and uplink handover boundaries are more closely matched.

If server selection is based predominantly on downlink received signal strength, the usefulness of mixed eNB deployment of heterogeneous networks, such as the wireless network 100, will be greatly diminished. This is because the larger coverage area of the higher powered macro eNBs, such as the macro eNBs 110a-c, limits the benefits of splitting the cell coverage with the pico eNBs, such as the pico eNB 110x, because, the higher downlink received signal strength of the macro eNBs 110a-c will attract all of the available UEs, while the pico eNB 110x may not be serving any UE because of its much weaker downlink transmission power. Moreover, the macro eNBs 110a-c will likely not have sufficient resources to efficiently serve those UEs. Therefore, the wireless network 100 will attempt to actively balance the load between the macro eNBs 110a-c and the pico eNB 110x by expanding the coverage area of the pico eNB 110x. This concept is referred to as cell range extension (CRE).

The wireless network 100 achieves CRE by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, the wireless network 100 provides a fixed partitioning of resources between the macro eNBs 110a-c and the pico eNB 110x. However, even with this active balancing of load, downlink interference from the macro eNBs 110a-c should be mitigated for the UEs served by the pico eNBs, such as the pico eNB 110x. This can be accomplished by various methods, including interference cancellation at the UE, resource coordination among the eNBs 110, or the like.

In a heterogeneous network with cell range extension, such as the wireless network 100, in order for UEs to obtain service from the lower-powered eNBs, such as the pico eNB 110x, in the presence of the stronger downlink signals transmitted from the higher-powered eNBs, such as the macro eNBs 110a-c, the pico eNB 110x engages in control channel and data channel interference coordination with the dominant interfering ones of the macro eNBs 110a-c. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

For example, Almost Blank Subframe (ABS) subframes may be allocated among a cluster of eNBs. By assigning ABS subframes to certain eNBs, other eNB transmission are protected. For example, for a given subframe, if eNB A is assigned ABS subframes, eNB B may transmit a signal that is effectively protected from or limited in interference from eNB A. For example, a prohibited subframe of the first eNB may correspond to a protected subframe of a second interfering eNB. Thus, the first eNB is the only eNB transmitting data during the first eNB's protected subframe. Common subframes may be used for data transmission by multiple eNBs. Common subframes may also be referred to as "unclean" subframes because of the possibility of interference from other eNBs.

Heterogeneous networks may have eNBs of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

Another example interference management scheme that may be employed in LTE/-A is the slowly-adaptive interference management. Using this approach to interference management, resources are negotiated and allocated over time scales that are much larger than the scheduling intervals. The goal of the scheme is to find a combination of transmit powers for all of the transmitting eNBs and UEs over all of the time or frequency resources that maximizes the total utility of the network. "Utility" may be defined as a function of user data rates, delays of quality of service (QoS) flows, and fairness metrics. Such an algorithm can be computed by a central entity that has access to all of the information used for solving the optimization and has control over all of the transmitting entities. This central entity may not always be practical or even desirable. Therefore, in alternative aspects a distributed algorithm may be used that makes resource usage decisions based on the channel information from a certain set of nodes. Thus, the slowly-adaptive interference algorithm may be deployed either using a central entity or by distributing the algorithm over various sets of nodes/entities in the network.

In deployments of heterogeneous networks, such as the wireless network 100, a UE may operate in a dominant interference scenario in which the UE may observe high interference from one or more interfering eNBs. A dominant interference scenario may occur due to restricted association. For example, in FIG. 1, the UE 120y may be close to the femto eNB 110y and may have high received power for the eNB 110y. However, the UE 120y may not be able to access the femto eNB 110y due to restricted association and may then connect to the macro eNB 110c (as shown in FIG. 1) or to the femto eNB 110z also with lower received power (not shown in FIG. 1). The UE 120y may then observe high interference from the femto eNB 110y on the downlink and may also cause high interference to the eNB 110y on the uplink. Using coordinated interference management, the eNB 110c and the femto eNB 110y may communicate over the backhaul 134 to negotiate resources. In the negotiation, the femto eNB 110y agrees to cease transmission on one of its channel resources, such that the UE 120y will not experience as much interference from the femto eNB 110y as it communicates with the eNB 110c over that same channel.

In addition to the discrepancies in signal power observed at the UEs in such a dominant interference scenario, timing delays of downlink signals may also be observed by the UEs, even in synchronous systems, because of the differing distances between the UEs and the multiple eNBs. The eNBs in a synchronous system are presumptively synchronized across the system. However, for example, considering a UE that is a distance of 5 km from the macro eNB, the propagation delay of any downlink signals received from that macro eNB would be delayed approximately 16.67 μs (5 km÷3×10$^8$, i.e., the speed of light, 'c'). Comparing that downlink signal from the macro eNB to the downlink signal from a much closer femto eNB, the timing difference could approach the level of a time-to-live (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

Figure 4:
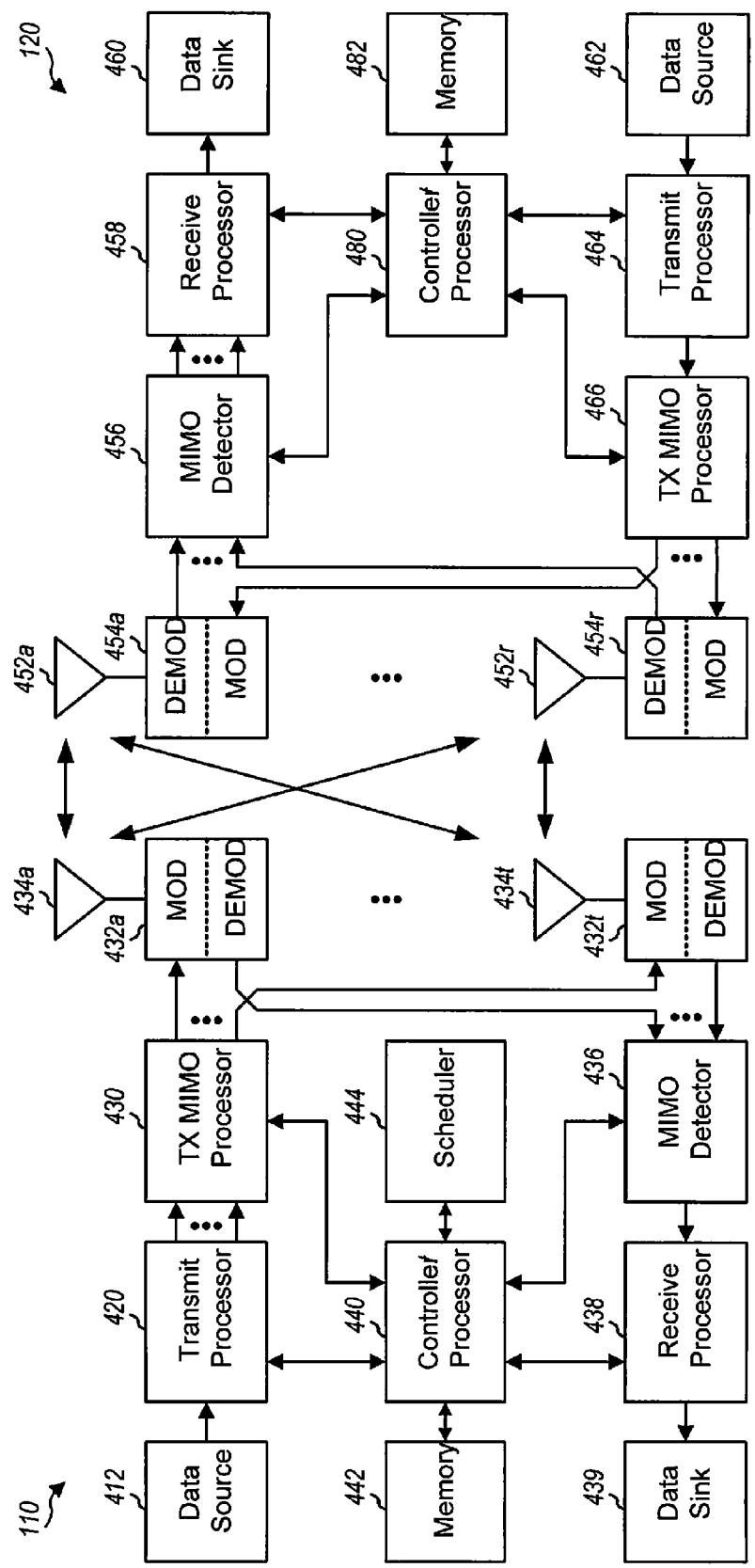
FIG. 4 is a block diagram conceptually illustrating a design of a base station/eNB and a UE configured according to one aspect of the present disclosure.

FIG. 4 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 434a through 434t, and the UE 120 may be equipped with antennas 452a through 452r.

At the eNB 110, a transmit processor 420 may receive data from a data source 412 and control information from a controller/processor 440. The control information may be for the PBCH, PCFICH, PHICH, PDCCH, etc. The data may be for the PDSCH, etc. The transmit processor 420 may process (e.g., encode and symbol map) the data and control information to obtain data symbols and control symbols, respectively.

The transmit processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the eNB 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the eNB 110. At the eNB 110, the uplink signals from the UE 120 may be received by the antennas 434, processed by the modulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440.

The controllers/processors 440 and 480 may direct the operation at the eNB 110 and the UE 120, respectively. The controller/processor 440 and/or other processors and modules at the eNB 110 may perform or direct the execution of various processes for the techniques described herein. The controllers/processor 480 and/or other processors and modules at the UE 120 may also perform or direct the execution of the functional blocks illustrated in FIGS. 7 and 8, and/or other processes for the techniques described herein. The memories 442 and 482 may store data and program codes for the eNB 110 and the UE 120, respectively. A scheduler 444 may schedule UEs for data transmission on the downlink and/or uplink.

In LTE systems up through LTE Rel-11, a single downlink control channel typically only schedules a single PDSCH transmission in one subframe, or a single PUSCH transmission in one subframe. Currently, the only exception to the single PDSCH/PUSCH transmission scheduling is for TDD configuration #0, in which a single UL grant may schedule two uplink PUSCH transmissions. Each control channel transmission consumes certain resources, e.g., 2 control channel elements (CCEs) or 72 REs, which are equivalent to half of a physical resource block (PRB) pair for some downlink control information (DCI) and some UEs. However, it is worth noting that, at least for distributed control channel transmissions (legacy PDCCH or EPDCCH), the actual dimensional loss due to a control channel transmission may be much larger. For example, one control symbol for legacy PDCCH (a 7% overhead for normal CP) would be needed for a single control channel transmission. At least two PRB pairs would be needed for distributed EPDCCH (a 4% overhead in a 10 MHz system).

Figure 5A:
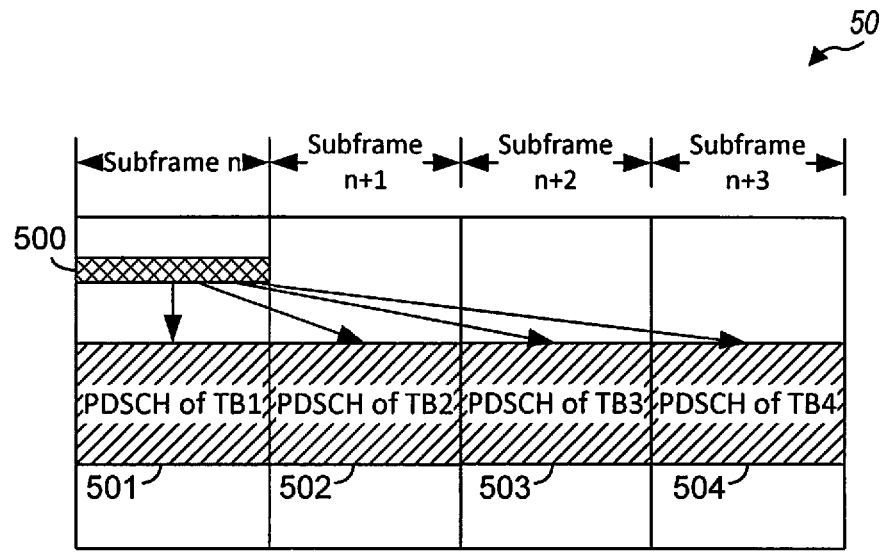
FIGS. 5A and 5B are block diagrams illustrating four subframes of a transmission frame.

The reduction of control channel overhead may be realized using multi-subframe scheduling. With multi-subframe scheduling, one control channel can schedule DL/UL transmissions over two or more subframes. FIG. 5A is a block diagram illustrating four subframes of a transmission frame 50. One control channel, control channel 500, which may be either a legacy PDCCH or a new EPDCCH, schedules four PDSCH transmissions, PDSCH 501-504, each with its own transport block (TB), TB1-TB4, such that the same transport block is not repeated over multiple subframes. Thus, the control channel overhead is reduced as only one control channel, control channel 500, is used to schedule four different PDSCH transmissions, PDSCH 501-504.

Figure 5B:
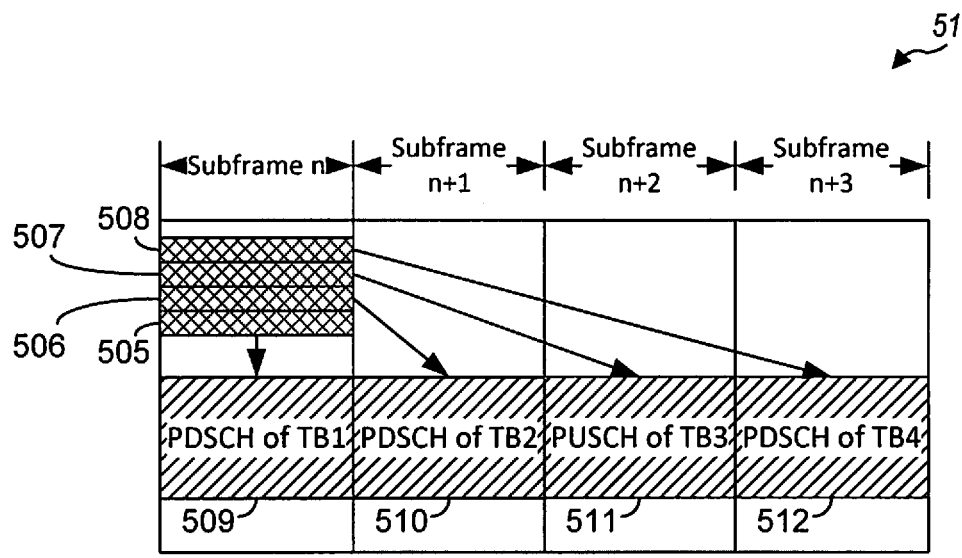

It should further be noted that control channel overhead may also be reduced using cross-subframe scheduling. FIG. 5B is a block diagram illustrating four subframes of a transmission frame 51. In cross-subframe scheduling, one subframe carries two or more control channels scheduling two or more respective DL or UL subframes. For example, as illustrated, subframe n includes four separate control channels, control channels 505-508. Each of control channels 505-508 schedules a corresponding DL or UL channel. Control channel 505 schedules PDSCH 509 with TB1, control channel 506 schedules PDSCH 510 with TB2, control channel 507 schedules PUSCH 511 with TB3, and control channel 508 schedules PDSCH 512 with TB4. As such, while multiple control channels are used to schedule individual corresponding DL/UL channels, each of control channels 505-508 are located in subframe n, while subframes n+1–n+3 do not include such control overhead.

The carrier type defined for current and previous LTE implementations is generally referred to as legacy carrier type (LCT) or backward compatible carrier type. With LCT implementations, there is typically at least one control symbol in a subframe. This control symbol generally is located in the $1^{st}$ symbol in a subframe. PDSCH/EPDCCH usually starts from the $2^{nd}$ symbol or later in a subframe for such LCT depending on the number of allocated legacy control symbols in the subframe. For small bandwidths (e.g., 10 or less resource blocks per slot), the number of legacy control symbols can be up to 4. For large bandwidths (e.g., more than 10 resource blocks per slot), the number of legacy control symbols can be up to 3. In the new LTE carrier type, generally referred to as new carrier type (NCT), which is non-backward compatible, there is no legacy control region. As a result, PDSCH/EPDCCH may start from the $1^{st}$ symbol in the subframe. In LTE Rel-12, service coverage may be provided through a high volume of small cells, such as pico cells and/or femto cells, in addition to the higher-powered macro cells. The provision of services with a high volume of small cells may generally be referred to as small cell densification, and is a likely deployment scenario. Each cell may serve a very limited number of UEs. Even for LCT implementations in an LTE Rel-12 system, it may be possible to consider starting PDSCH/EPDCCH from the first symbol (symbol 0) in small cell densification deployments. Because each of the small cells may only be serving one or very few UEs, the need for the legacy control region would be reduced.

Control channel overhead may be reduced by starting PDSCH/EPDCCH from symbol 0, combined with multi-subframe/cross-subframe scheduling. For LTE Rel-12 and beyond, the legacy PDCCH region may be omitted, which allows for the PDSCH to start from symbol 0. However, because there may be concerns regarding backward compatibility (e.g., supporting paging, SIB, etc.) in some subframes, there may be a use for common search space (CSS) via PDCCH in those subframes, such that removal of legacy control may only be implemented for a subset of subframes. In such deployments, the absence of a legacy control region and, thus, a PDSCH starting from symbol 0, may be indicated to available UEs using dynamic or semi-static signaling from the respective base stations.

When EPDCCH is configured in an advanced LTE system, UEs would still attempt to monitor PDCCH at least for the CSS, as there is no CSS for EPDCCH. As a result, even if the legacy control region may be omitted in some subframes, in the subframes where the legacy control region cannot be omitted, there would be at least one symbol for legacy control, which contributes to DL overhead. If legacy control regions were completely omitted, PHICH would not be transmitted, which means that non-adaptive UL re-transmissions could not be supported. Therefore, in order to support such UL re-transmissions, PDCCH or EPDCCH would still have to be used, which requires DL overhead. In addition, omitting legacy control region in a set of subframes also mandates the use of EPDCCH in the set of subframes for the UEs served by the cell.

For purposes of explanation, numerical examples of LTE systems may be provided which illustrate the available REs in addition to various savings that may be achieved by reducing or even completely omitting legacy control regions. The conceptual LTE system of this example operates at 10 MHz, with two common reference signal (CRS) ports. Moreover, the system assumes one control symbol, minimum PHICH resources, and a normal cyclic prefix (CP). In such an example system, there would be 50 RBs, which equals 600 tones, and 14 symbols. Thus, the total number of available resource elements (REs) would be 600*14=8400 REs. Transmission of a CRS in the first symbol of the first slot would account for 200 REs. There are three additional symbols containing CRS, resulting in a total cost of 200*4=800 REs for the CRS. A PCFICH in the first symbol of the first slot would account for 16 REs. The assumed minimum PHICH resource corresponds to a ceiling (50/8/6) of two PHICH groups or 2*12=24 PHICH REs. For CRS-based PDSCH, there may be up to 600*13−600=7200 REs available for PDSCH, assuming one control symbol (14−1=13), where the 600 REs represent the cost of the remaining three CRS symbols (the first CRS being accounted for in the reduction of the one symbol for the control symbol), and without considering other signals, such as PSS/SSS/PBCH, and the like. If the legacy control region is completely omitted, there may be up to 600*14−800=7600 REs available for PDSCH, where the 800 RE cost represents the cost of all four CRS symbols. This omission of legacy control regions accounts for an increase of 400 REs (from 7200), or 400/7200=5.5%.

If a legacy control region is partially allowed, e.g., PCFICH/PHICH and a single PDCCH. For aggregation level 1 PDCCH (36 REs), there would be: 7600−16 (first symbol PCFICH)−24 (PHICH)−36 (aggregation level 1 PDCCH)=7524 REs, an increase of 324 REs or 324/7200=4.5%. For aggregation level 2 PDCCH (72 REs), there would be: 7600−16 (first symbol PCFICH)−24 (PHICH)−72 (aggregation level 2 PDCCH)=7488 REs, an increase of 288 REs or 288/7200=4.0%. For aggregation level 4 PDCCH (144 REs), there would be: 7600−16 (first symbol PCFICH)−24 (PHICH)−144 (aggregation level 4 PDCCH)=7416 REs, an increase of 216 REs or 216/7200=3.0%. If two PDCCHs, one level 4 and one level 2, there would be: 7600−16 (first symbol PCFICH)−24 (PHICH)−144 (aggregation level 4 PDCCH)−72 (aggregation level 2 PDCCH)=7344 REs, an increase of 144 REs or 144/7200=2.0%.

In DM-RS based PDSCH, for rank 1 and rank 2 PDSCH, there are 12 DM-RS REs per PRB pair, or a total of 12*50=600 DM-RS REs. If legacy control region is completely omitted, there may be up to 600*14−800−600=7000 REs available for PDSCH, an increase of 400 REs from 600*13−600−600=6600 assuming one control symbol, or 400/6600=6.1%. If legacy control region is partially allowed, there would be: 324/6600=4.9%, 288/6600=4.4%, 216/6600=3.3% and 144/6600=2.2% for one level 1 PDCCH, one level 2 PDCCH, one level 4 PDCCH, and one level 4+one level 2 PDCCHs, respectively.

Considering the numerical examples, the difference in overhead savings between completely omitting legacy control regions and partially omitting legacy control regions is only a few percentage points. Moreover, even considering a partial omission with transmitting two PDCCH in some symbols, there is still approximately 2.0% in overhead savings. Accordingly, various aspects of the present disclosure are directed to starting PDSCH/EPDCCH from symbol 0 while not completely omitting the legacy control region. Under such a configuration, some of the legacy control region may still transmit legacy signals/channels, e.g., PCFICH, PHICH, and/or PDCCH, or reserved for legacy control transmissions, while the remaining REs may be used by PDSCH, EPDCCH, or both.

Figure 6:
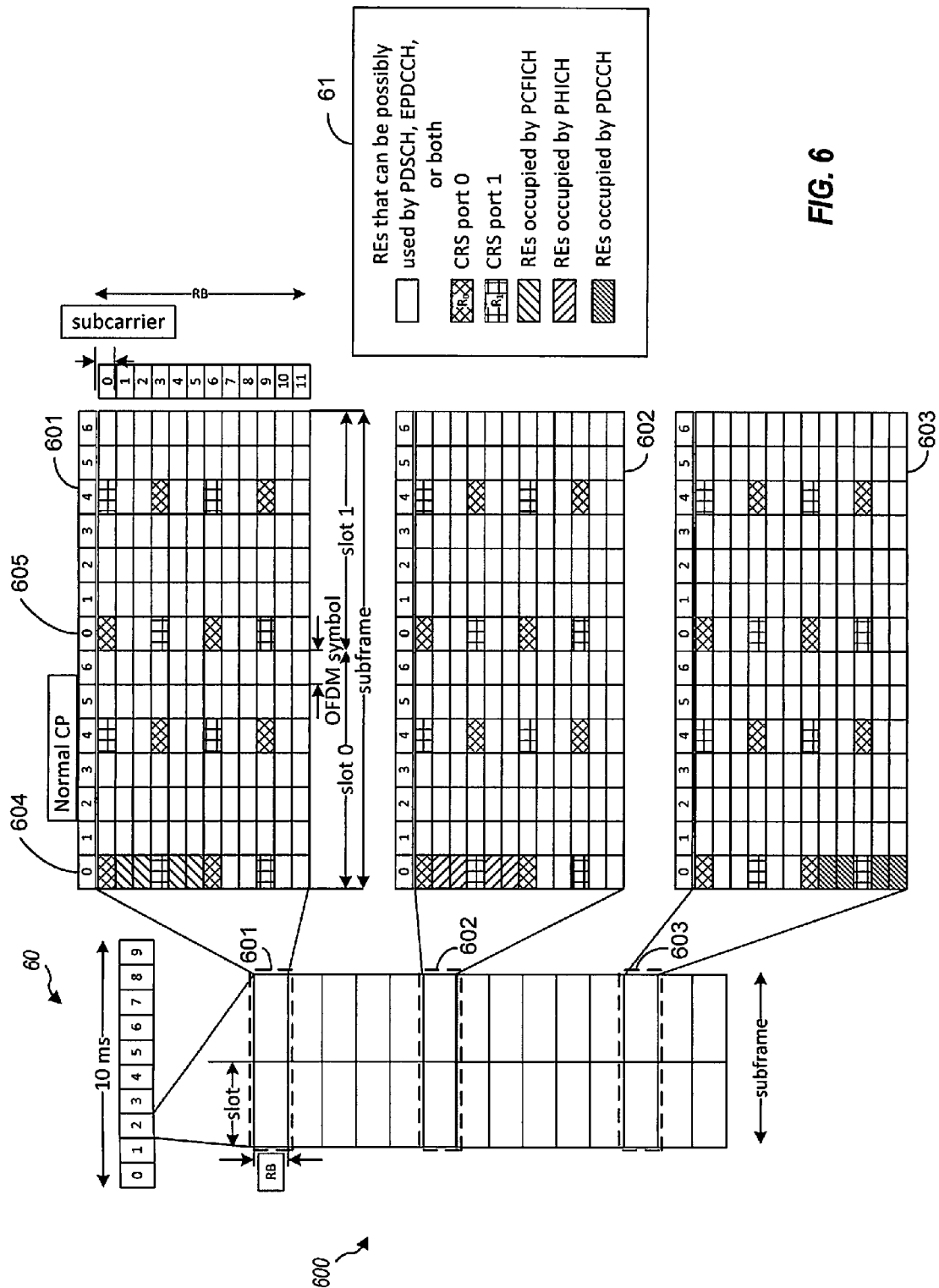
FIG. 6 is a block diagram illustrating a detailed mapping of transmission frame in a wireless system configured according to one aspect of the present disclosure.

FIG. 6 is a block diagram illustrating a detailed mapping of transmission frame 60 in a wireless system configured according to one aspect of the present disclosure. Transmission frame 60 includes 10 subframes. A single subframe, such as subframe 600 includes two slots with 14 resource blocks (RBs) in each slot. The detail illustrated in FIG. 6 shows three separate RBs 601-603 across subframe 600. RBs 601-603 include seven symbols for each of two slots of subframe 600 across 12 subcarriers. With reference to the figure key 61, CRS signals are shown in the first symbol, symbol 0-604, at subcarriers 0, 3, 6, and 9. The CRS signals are repeated again in symbol 4, as well. The same arrangement is present in the second slot and for each of RBs 602 and 603.

In implementing one aspect of the present disclosure, data transmissions, through PDSCH, and EPDCCH transmissions are allowed in symbol 0-604. However, legacy control transmissions are also allowed. For example, in RB 601, PCFICH may occupy the REs at symbol 0-604 in subcarriers 1, 2, 4, and 5. Similarly, in RBs 602, PHICH may occupy the REs at symbol 0-604 in subcarriers 1, 2, 4, and 5, as well. In RBs 603, PDCCH may occupy the REs at symbol 0-604 in subcarriers 7, 8, 10, and 11. However, as noted above in the numerical example, even by only partially omitting legacy control transmissions and allowing PDSCH/EPDCCH transmissions in symbol 0-604, an overhead savings may be realized.

Figures 7, 8:
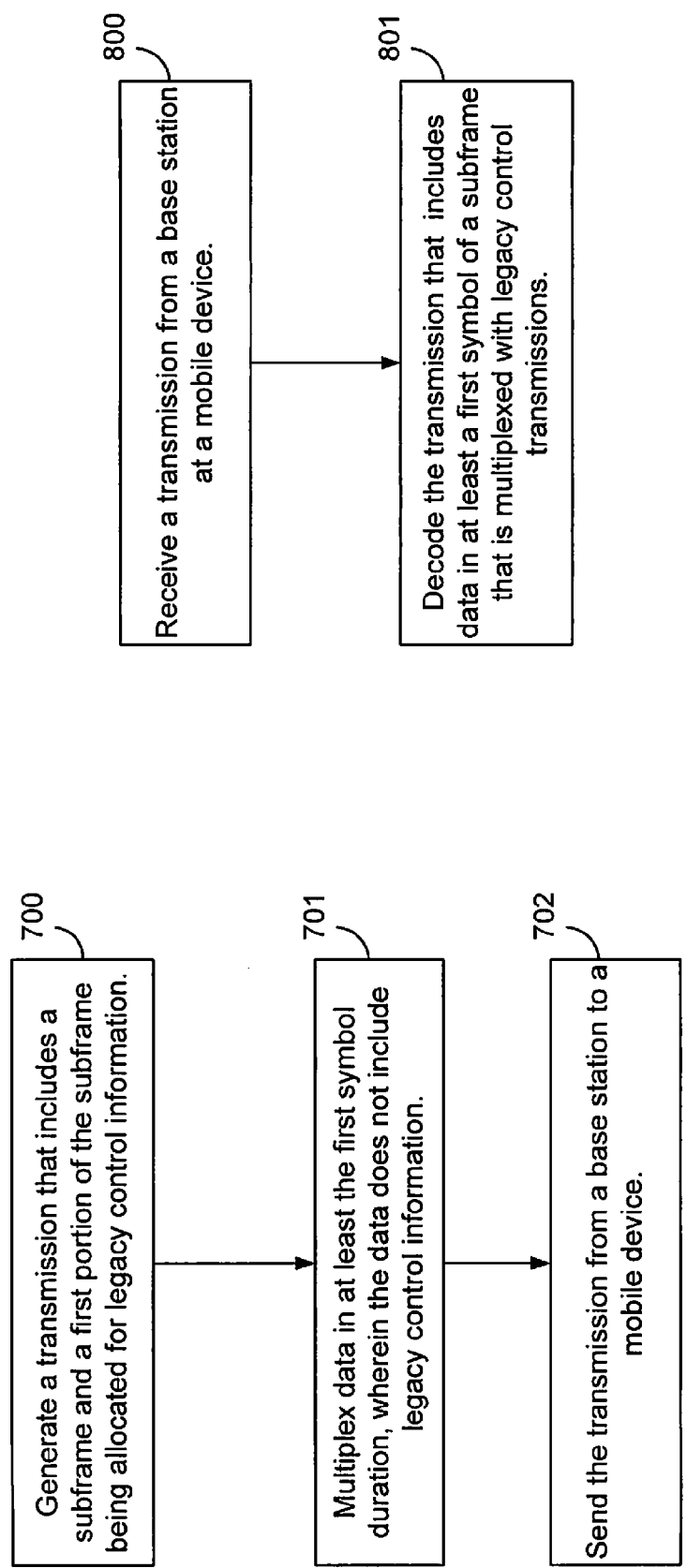
FIG. 7 is a functional block diagram illustrating example blocks executed to implement one aspect of the present disclosure.
FIG. 8 is a functional block diagram illustrating example blocks executed to implement one aspect of the present disclosure.

FIG. 7 is a functional block diagram illustrating example blocks executed to implement one aspect of the present disclosure.

At block 700, a transmission is generated at a base station. The transmission includes a subframe and a first portion of the subframe being allocated for legacy control information. The first portion of the subframe includes at least a first symbol duration. The legacy control information may include various signals, such as PCFICH, PHICH, PDCCH, and the like. The base station schedules the legacy control information at certain frequencies in the first symbol duration.

At block 701, data is multiplexed in at least the first symbol duration, wherein the data does not include legacy control information. Data transmissions, such as through PDSCH, may be scheduled in the first symbol duration. The data transmissions may be scheduled using rate matching in which the data is scheduled in subcarriers where legacy control information is not already scheduled or allocated.

In certain subframes, the base station may schedule data for transmission in each of the subcarriers that do not include reference signals. In such circumstances, when legacy control information is scheduled, the legacy control information is placed in the appropriate subcarrier puncturing any data transmissions scheduled for that particular subcarrier or resource element (RE). In other aspects, data may be rate matched to avoid REs that legacy control information has been scheduled or in REs that have been reserved.

When other legacy control information, which has not been scheduled yet, is to be sent, this other legacy control information may puncture RE where data transmissions have already been scheduled. The data can be unicast PDSCH, broadcast PDSCH, EPDCCH, or a combination thereof. The data may also be limited to unicast traffic only (e.g., unicast data via PDSCH or unicast control via EPDCCH). Since the number of symbols for the legacy control region can be larger than 1, the multiplexing of PDSCH/EPDCCH in the same symbol can be extended to other legacy control symbols as well.

Alternatively, the multiplexing can be done only in the first symbol when the number of control symbols is limited to one at least in some subframes (e.g., the subframes where there is no broadcast). Additionally or separately, the number of control symbols can be larger than one in at least some subframes, and the multiplexing can be done in the last symbol of the control region, or in all the control symbols. A UE can determine the set of subframes where there is only one control symbol in a semi-static (e.g., via RRC) or a dynamic manner (e.g., via PCFICH or DCI).

At block 702, the transmission is sent from a base station to a mobile device. Once the transmission has been generated with the data and legacy control information multiplexed into the first symbol duration, the base station sends the transmission to a mobile device.

FIG. 8 is a functional block diagram illustrating example blocks executed to implement one aspect of the present disclosure from a mobile device in communication with a base station configured to operate as described in FIG. 7. At block 800, a mobile device receives a transmission from a base.

At block 801, the mobile device decodes the transmission. The transmission includes data in at least a first symbol of a subframe from a base station. This data transmission is multiplexed with legacy control transmissions in at least the first symbol. The data can be unicast PDSCH, broadcast PDSCH, EPDCCH, or a combination thereof. The data may also be limited to unicast traffic only (e.g., unicast data via PDSCH or unicast control via EPDCCH).

Figure 9:
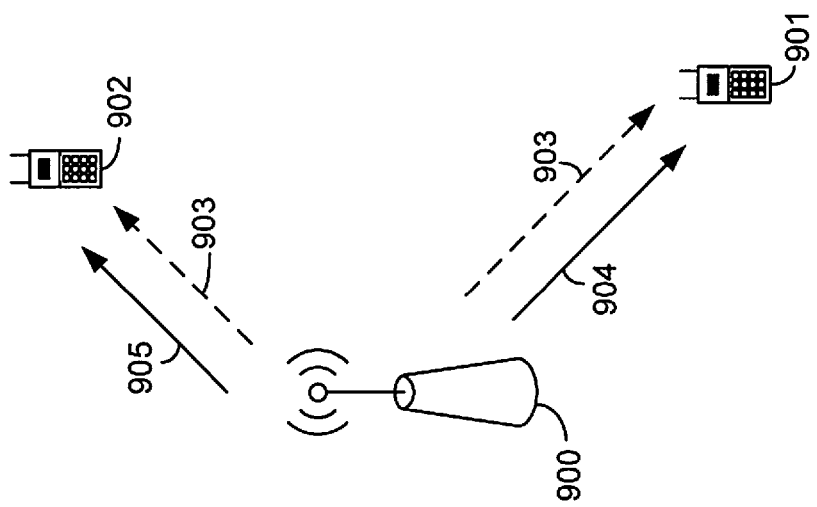
FIG. 9 is a block diagram illustrating a base station and UEs configured according to one aspect of the present disclosure.

A base station may provide an indication of PDSCH/EPDCCH starting from the first symbol, symbol 0, and the multiplexing with some of the legacy control signals/channels to a UE semi-statically, dynamically, or a combination thereof. FIG. 9 is a block diagram illustrating a base station 900 and UEs 901 and 902 configured according to one aspect of the present disclosure. In order to notify UEs 901 and 902 that, in communication signals 904 and 905, PDSCH/EPDCCH will start from the first symbol and that data and legacy control signals may be multiplexed in the same symbol, base station 900 transmits an indication 903. Indication 903 may be unicast, in which case base station 900 transmits indication 903 to 901. Indication 903 may also be broadcast by base station 900. In such case, both UEs 901 and 902 receive indication 903 identifying to UEs 901 and 902 that PDSCH/EPDCCH will start from the first symbol and may be multiplexed with legacy control information. For example, indication 903 transmitted by base station 900 for EPDCCH can be semi-static, and subframe dependent, while indication 903 transmitted by base station 900 for PDSCH can be dynamic (e.g., in FDD, subframes 0/4/5/9 may be indicated as reserved for EPDCCH to start from the second symbol, while the other subframes may be indicated as reserved EPDCCH starting from the first symbol). When base station 900 has data to transmit to any of UEs 901 or 902, it may dynamically include a message in indication 903 that notifies UEs 901 and 902 that PDSCH may be transmitted from the first symbol.

For broadcast aspects, PCFICH may be used as indication 903. For example, a Rel-12 UE, such as UE 901, may interpret PCFICH values received in indication 903 differently from legacy values or uses a reserved PCFICH value to determine whether PDSCH/EPDCCH can start from the first symbol. As an example, a reserved PCFICH value may be used for the indication. As another example, an existing PCFICH value (e.g., 3 control symbols) may be re-interpreted as zero control symbols. For unicast aspects, a dynamic indication, such as indication 903 in the dynamic indication aspect, for the PDSCH starting symbol can be achieved for both the compact DCI format 1A and the mode-dependent DCI format (e.g., DCI format 2, DCI format 2D, etc.) However, it may sometimes be preferable that the dynamic indication via DCI is only provided for the mode-dependent DCI format in indication 903. For DCI format 1A, the starting symbol may still be based on PCFICH or RRC based. For examples implementing dynamic indication via DCI, DCI formats 2/2A may re-interpret the 1-bit "transport block to codeword swap flag" as the PDSCH starting symbol indicator in indication 903. If the bit is set to 0, then the PDSCH may be following PCFICH or RRC configuration. Otherwise, the PDSCH may start from the first symbol, symbol 0. In another example, DCI formats 2B/2C may provide for re-interpretation of the 1-bit "scrambling identity" as the PDSCH starting symbol indicator. Additionally, DCI format 2D, as part of RRC configuration for the 2-bit PQI (PDSCH rate matching and quasi-co-location indicator), may add indication of the PDSCH starting at the first symbol, symbol 0, in the RRC configuration for one or more PQI values.

Figure 10:
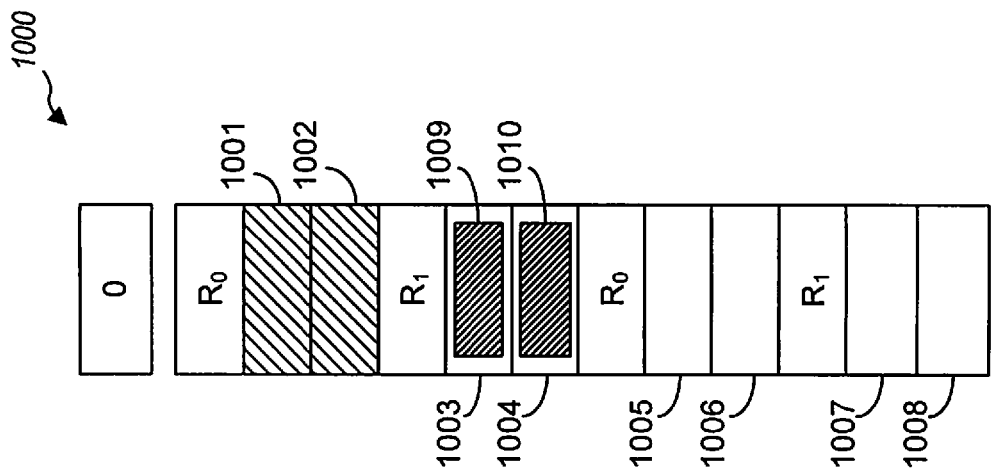
FIG. 10 is a block diagram illustrating a first symbol of a data transmission configured according to one aspect of the present disclosure.

Multiplexing PDSCH/EPDCCH with legacy control signals/channels in the same symbol may either be implemented for PDSCH/EPDCCH transmission to be rate matched around legacy control signals/channels, or to punctured by legacy control signals/channels, or a combination of rate matching and puncturing. FIG. 10 is a block diagram illustrating a first symbol 1000 of a data transmission configured according to one aspect of the present disclosure. Symbol 1000 includes 12 REs at 12 subcarriers of the transmission. The rate matching or puncturing operation may be the same for both PDSCH and EPDCCH, or alternatively, different for PDSCH and EPDCCH. In an example illustrated by first symbol 1000, PDSCH is rate matched to occupy REs 1005, 1006, 1007, and 1008, while EPDCCH is scheduled to occupy REs 1003 and 1004. During generation of the transmission, CRS for R0 and R1 are placed at the known locations, while PCFICH are scheduled to occupy REs 1001 and 1002. While EPDCCH is scheduled to occupy REs 1003 and 1004, PHICH transmissions 1009 and 1010 arise and puncture the EPDCCH transmissions of REs 1003 and 1004.

In additional example aspects, PDSCH/EPDCCH rate matching or puncturing decisions may also be legacy channel/signals dependent. In another example illustrated by first symbol 1000, PCFICH is scheduled to occupy REs 1001 and 1002. PDSCH corresponding to a downlink PDCCH are scheduled to occupy REs 1003 and 1004. However, the PDSCH scheduled for REs 1003 and 1004 are punctured by PHICH in RE 1003 and another PDCCH in RE 1004. The differentiation of different legacy channel/signals can reflect different characteristics of the legacy channel/signals. The presence of PCFICH and the number REs of PCFICH is generally known and semi-static to all UEs served by a cell. As a result, rate matching around PCFICH REs would improve PDSCH/EPDCCH decoding efficiency without any increase of dimensional loss. On the other hand, the presence of PHICH and the number of REs of PHICH in a cell is generally dynamic and a UE may only know the presence of a subset of PHICH REs (e.g., only knows the PHICH REs that the UE monitors). As a result, puncturing based operation for PHICH REs is more preferable in order to avoid over-dimensioning the number of PHICH REs for PDSCH/EPDCCH to rate match around. For PDCCH transmissions in the legacy control region, rate matching operation around PDCCH REs may be performed by a UE for the PDCCH scheduling the corresponding PDSCH, while puncturing based operation may be performed by the UE for other PDCCH transmissions. This is because the UE may not know the presence of other PDCCH transmissions.

As an example, a cell may transmit a first PDCCH and a second PDCCH in a subframe, for a PDSCH scheduled by the first PDCCH, the PDSCH would rate match resources used by the first PDCCH, but is punctured by the second PDCCH. As another example, a cell may employ multi-subframe scheduling and transmits a PDCCH in subframe n1 scheduling a first PDSCH in subframe n1 and a second PDSCH in subframe n2 (where n2≠n1), where the first PDSCH rate matches around the PDCCH in subframe n1 but the second PDSCH in subframe n2 does not rate match around a PDCCH in subframe n2. As yet another example, a cell may employ cross-subframe scheduling and transmits a first PDCCH and a second PDCCH in subframe n1, for scheduling a first PDSCH in subframe n1 and a second PDSCH in subframe n2 (where n2≠n1), respectively. In this case, the first PDSCH rate matches around the first and second PDCCH in subframe n1 while the second PDSCH in subframe n2 does not rate match around any PDCCH in subframe n2.

In additional aspects, some REs in the legacy control regions can be reserved and made unavailable for PDSCH/EPDCCH. For example, illustrated by symbol 1000, REs 1003 and 1004, which are typically considered in the legacy control region, are reserved and cannot be used for PDSCH/EPDCCH transmissions. These REs may potentially be used by common search space related operation (e.g., paging, system information broadcast). This implementation may also reserve REs of CCE 0/1/2/3, or the like. This reservation may also be subframe dependent (e.g., only performed in subframes 0/4/5/9 in FDD. As another example, there may be no reservation in other subframes in FDD, or reservations in subframes #5, #25, #45).

As referenced above, PDCCH may use different aggregation levels, which also affect the control overhead. An additional consideration is that there may be PDCCH aggregation level ambiguity. This ambiguity may impact PDSCH/EPDCCH rate matching. An eNB may use an aggregation level 1 (L1) for PDCCH transmission. A related UE may successfully decode the PDCCH assuming the same aggregation level L1, but may also successfully decode the PDCCH assuming a different aggregation level, such as aggregation level 2 (L2) when the two PDCCH decoding candidates have the same starting CCE index. In this starting CCE index matching scenario, the eNB may assume an L1 aggregation level PDCCH for rate matching the PDSCH/EPDCCH transmission. However, at the UE, the UE may assume an L2 aggregation level PDCCH for rate matching the PDSCH/EPDCCH reception. If this mismatched aggregation level PDCCH is made between the eNB and UE, the PDSCH/EPDCCH transmissions may not be successfully decoded.

In order to address this issue, the indications from the base stations, such as indication 903 (FIG. 9), may also identify which aggregation level is being used for rate matching. A compatible indication, such as indication 903, that includes such an aggregation level indication may be defined in the communication standards, or may be provided through various signaling (e.g., RRC or part of the DCI). Indication 903, therefore, may be DCI format dependent, e.g., if compact DCI formats (e.g., 1A), assuming aggregation level 1; if MIMO DCI formats (e.g., DCI format 2D), assuming aggregation level 2. The aggregation level indication of indication 903 may be for all cases (regardless of whether there is ambiguity or not), or for only the cases when there is ambiguity. If the actual aggregation level for PDCCH is higher than the indicated aggregation level for PDSCH/EPDCCH rate matching, the extra CCEs would be based on the puncturing approach (PDSCH/EPDCCH is mapped to these extra CCEs, but the transmission is punctured by PDCCH).

Additionally, the enabling or disabling of multiplexing PDSCH/EPDCCH and legacy control channel/signals in a same symbol may also depend on whether EPDCCH is configured for a UE or not. As an example, enabling of multiplexing PDSCH/EPDCCH and legacy control channel/signals in a same symbol is performed in a subframe regardless of whether the UE is configured to monitor EPDCCH in the subframe or not. Alternatively, enabling of multiplexing PDSCH/EPDCCH and legacy control channel/signals in a same symbol is performed in a subframe if the UE is not configured to monitor EPDCCH in the subframe. However, if in a subframe where the UE is configured to monitor EPDCCH, multiplexing PDSCH/EPDCCH and legacy control channel/signals in a same symbol is disabled in the subframe.

Additionally, the enabling or disabling of multiplexing PDSCH/EPDCCH and legacy control channel/signals in a same symbol may also depend on whether multi-subframe scheduling and/or cross-subframe scheduling is enabled or not. As an example, enabling of multiplexing PDSCH/EPDCCH and legacy control channel/signals in a same symbol is performed in a subframe regardless of whether the UE is configured with multi-subframe or cross-subframe scheduling or not. Alternatively, enabling of multiplexing PDSCH/EPDCCH and legacy control channel/signals in a same symbol is performed depends on multi-subframe and/or cross-subframe operation. As an example, in a subframe if the UE receives a PDSCH with a PDCCH in the same subframe, multiplexing PDSCH/EPDCCH and legacy control/signals in a same symbol is performed. However, if in a subframe where the UE transmits a PDSCH which is scheduled by a PDCCH in a different subframe, multiplexing PDSCH/EPDCCH and legacy control channel/signals in a same symbol is disabled in the subframe, and PDSCH can assume no presence of legacy control channel/signals.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 7 and 8 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. A computer-readable storage medium may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, non-transitory connections may properly be included within the definition of computer-readable medium. For example, if the instructions are transmitted from a website, server, or other remote source using a coaxial cable, fiber optic cable, twisted pair, or digital subscriber line (DSL), then the coaxial cable, fiber optic cable, twisted pair, or DSL are included in the definition of medium. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, comprising:
receiving a transmission from a base station at a mobile device; and
decoding the transmission, wherein the transmission includes a data transmission in at least a first symbol of a subframe from a base station, wherein the first symbol is an initial subframe symbol at a beginning of the subframe, and the data transmission is multiplexed with legacy control transmissions in at least the first symbol.

2. The method of claim 1, wherein the first symbol includes legacy control information; and
wherein the multiplexing of the data transmission with the legacy control transmissions comprises multiplexing the legacy control information in at least the first symbol with at least one of:
a physical downlink shared channel (PDSCH), or
an enhanced physical downlink control channel (EPDCCH).

3. The method of claim 1, further comprising:
receiving an indication from the base station, wherein the indication identifies that the data transmission is sent in at least the first symbol of the subframe.

4. The method of claim 3, wherein the receiving the indication occurs one of:

semi-statically;
dynamically; or
as a combination thereof.

5. The method of claim 1, wherein generation of the multiplexed legacy control transmissions with the data transmission is performed only for unicast data transmissions.

6. The method of claim 1, wherein the legacy control transmissions comprise at least one of:
a physical control format indicator channel (PCFICH),
a physical hybrid automatic repeat request indicator channel (PHICH), or
a physical downlink control channel (PDCCH).

7. The method of claim 1, wherein the multiplexing of the legacy control transmissions with the data transmission comprises puncturing one or more resource elements associated with the data transmission in at least the first symbol and scheduling at least a portion of the legacy control transmissions in the one or more punctured resource elements.

8. The method of claim 1, wherein the multiplexing of the legacy control transmissions with the data transmission comprises rate matching the data transmission around a set of resource elements of at least the first symbol in which for at least a portion of the legacy control transmissions is scheduled.

9. The method of claim 8, wherein the multiplexing of the legacy control transmissions with the data transmission is performed only for a subset of subframes.

10. A method of wireless communication, comprising:
generating a transmission, wherein the transmission includes a subframe, a first portion of the subframe being allocated for legacy control information, the first portion including at least a first symbol, wherein the first symbol is an initial subframe symbol at a beginning of the subframe;
multiplexing data in at least the first symbol, wherein the data does not include legacy control information; and
sending the transmission from a base station to a mobile device.

11. The method of claim 10, wherein the first symbol includes legacy control information; and
wherein the multiplexing comprises multiplexing legacy control information in the first symbol with at least one of:
a physical downlink shared channel (PDSCH), or
an enhanced physical downlink control channel (EPDCCH).

12. The method of claim 10, wherein the transmission includes at least one of:
a physical control format indicator channel (PCFICH),
a physical hybrid automatic repeat request indicator channel (PHICH), or
a physical downlink control channel (PDCCH).

13. The method of claim 10, wherein the multiplexing comprises:
puncturing one or more resource elements associated with the transmission in at least the first symbol for transmission of at least a portion of the legacy control information.

14. The method of claim 10, wherein the sending the transmission comprises:
scheduling the data transmission around a set of resource elements of the at least first symbol reserved for at least a portion of the legacy control information.

15. The method of claim 14, wherein a reservation is performed only for a subset of subframes.

16. The method of claim 10, further comprising:
transmitting, by the base station, an indication to the mobile device, wherein the indication identifies that the data transmission is sent in the first symbol of the subframe.

17. An apparatus configured for wireless communication, the apparatus comprising:
at least one processor; and
a memory coupled to the at least one processor,
wherein the at least one processor is configured:
to receive a transmission from a base station at a mobile device; and
to decode the transmission, wherein the transmission includes data transmission in at least a first symbol of a subframe from a base station, wherein the first symbol is an initial subframe symbol at a beginning of the subframe, and the data transmission is multiplexed with legacy control transmissions in at least the first symbol.

18. The apparatus of claim 17, wherein the first symbol includes legacy control information; and
wherein the multiplexing of the data transmission with the legacy control transmissions comprises multiplexing the legacy control information in at least the first symbol with at least one of:
a physical downlink shared channel (PDSCH), or
an enhanced physical downlink control channel (EPDCCH).

19. The apparatus of claim 17, further comprising configuration of the at least one processor to receive an indication from the base station, wherein the indication identifies that the data transmission is sent in at least the first symbol of the subframe.

20. The apparatus of claim 19, wherein the configuration of the at least one processor to receive the indication occurs one of:
semi-statically;
dynamically; or
as a combination thereof.

21. The apparatus of claim 17, wherein generation of the multiplexed legacy control transmissions with the data transmission is performed only for unicast data transmissions.

22. The apparatus of claim 17, wherein the legacy control transmissions comprise at least one of:
a physical control format indicator channel (PCFICH),
a physical hybrid automatic repeat request indicator channel (PHICH), or
a physical downlink control channel (PDCCH).

23. The apparatus of claim 17, wherein the multiplexing of the legacy control transmissions with the data transmission comprises puncturing one or more resource elements associated with the data transmission in at least the first symbol and scheduling at least a portion of the legacy control transmissions in the one or more punctured resource elements.

24. The apparatus of claim 17, wherein the multiplexing of the legacy control transmissions with the data transmission comprises rate matching the data transmission around a set of resource elements of at least the first symbol in which for at least a portion of the legacy control transmissions is scheduled.

25. The apparatus of claim 24, wherein the multiplexing of the legacy control transmissions with the data transmission is performed only for a subset of subframes.

26. An apparatus configured for wireless communication, the apparatus comprising:

at least one processor; and
a memory coupled to the at least one processor,
wherein the at least one processor is configured:
- to generate a transmission, wherein the transmission includes a subframe, a first portion of the subframe being allocated for legacy control information, the first portion including at least a first symbol of the subframe, wherein the first symbol is an initial subframe symbol at a beginning of the subframe;
- to multiplex data in at least the first symbol, wherein the data does not include legacy control information; and
- to send the transmission from a base station to a mobile device.

27. The apparatus of claim 26, wherein the first symbol includes legacy control information; and
wherein the configuration of the at least one processor to multiplex comprises configuration to multiplex legacy control information in the first symbol with at least one of:
a physical downlink shared channel (PDSCH), or
an enhanced physical downlink control channel (EPDCCH).

28. The apparatus of claim 26, wherein the configuration of the at least one processor to multiplex comprises configuration to puncture one or more resource elements associated with the transmission in at least the first symbol for transmission of at least a portion of the legacy control information.

29. The apparatus of claim 26, wherein the configuration of the at least one processor to send the transmission comprises configuration to schedule the transmission around a set of resource elements of the at least first symbol reserved for at least a portion of the legacy control information.

30. The apparatus of claim 26, further comprising configuration of the at least one processor to transmit, by the base station, an indication to the mobile device, wherein the indication identifies that the transmission is sent in the first symbol of the subframe.

* * * * *